(12) United States Patent
Morton et al.

(10) Patent No.: US 11,531,659 B2
(45) Date of Patent: Dec. 20, 2022

(54) EXTENSIBLE VERSION HISTORY AND COMPARISON WITHIN A BACKUP

(71) Applicant: EMC IP Holding Company LLC, Hopkinton, MA (US)

(72) Inventors: James Morton, Adamstown, MD (US); Lihui Su, Shanghai (CN); Gerald Jourdain, Hudson, NH (US); Ming Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 160 days.

(21) Appl. No.: 16/914,773

(22) Filed: Jun. 29, 2020

(65) Prior Publication Data

US 2021/0406233 A1 Dec. 30, 2021

(51) Int. Cl.
*G06F 16/00* (2019.01)
*G06F 16/21* (2019.01)
*G06F 7/08* (2006.01)

(52) U.S. Cl.
CPC .............. *G06F 16/219* (2019.01); *G06F 7/08* (2013.01)

(58) Field of Classification Search
CPC .................................. G06F 16/219; G06F 7/08
See application file for complete search history.

(56) References Cited

U.S. PATENT DOCUMENTS

| | | | |
|---|---|---|---|
| 2005/0138540 A1* | 6/2005 | Baltus | G06F 40/194 715/229 |
| 2014/0082464 A1* | 3/2014 | Sitrick | G06F 40/166 715/202 |
| 2014/0082473 A1* | 3/2014 | Sitrick | G06Q 10/101 715/230 |
| 2015/0379061 A1* | 12/2015 | Paraschivescu | G06F 16/2329 707/695 |
| 2016/0055143 A1* | 2/2016 | Goel | G06F 16/328 715/229 |
| 2016/0070717 A1* | 3/2016 | Bergner | G06F 16/178 707/638 |
| 2017/0192856 A1* | 7/2017 | Chin | G06F 16/1873 |
| 2017/0206233 A1* | 7/2017 | Lu | G06F 16/219 |
| 2018/0189369 A1* | 7/2018 | Baek | G06F 16/27 |

\* cited by examiner

*Primary Examiner* — Anhtai V Tran
(74) *Attorney, Agent, or Firm* — Dergosits & Noah LLP; Todd A. Noah (57) ABSTRACT

Described is a system for providing quick and efficient identification of a desired version of content from an editing history of the content. The system receives a search index identifying versions of content from an editing history of the content. The system sorts the search index according to sort criteria and receives a selection from the sorted search index of a first version of the content and a second version of the content. The system identifies and displays one or more content differences between the first and second versions of the content.

17 Claims, 10 Drawing Sheets

FIG. 1

| Item Name | Item Type | Asset | Location | Last Modified | Size | Backup Range |
|---|---|---|---|---|---|---|
| CustomerList.xlsx | Spreadsheet | JamesLaptop | C:\users\james\Documents | 01/02/2019 9:01PM | 22 KB | 1/1/2019 - 1/10/2019 |
| CustomerList.xlsx | Spreadsheet | JamesLaptop | C:\users\james\Documents | 01/11/2019 3:54AM | 23 KB | 1/11/2019 - 1/12/2019 |
| CustomerList.xlsx | Spreadsheet | JamesLaptop | C:\users\james\Documents\Backup | 01/11/2019 3:54AM | 23 KB | 1/12/2019 - Current |
| CustomerList.xlsx | Spreadsheet | JamesLaptop | C:\users\james\Documents | 01/13/2019 4:03AM | 30 KB | 1/13/2019 - 1/20/2019 |
| CustomerList.xlsx | Spreadsheet | JamesLaptop | C:\users\james\Documents | 01/21/2019 6:31PM | 36 KB | 1/21/2019 - Current |
| CustomerList.xlsx | Spreadsheet | FileServer1 | /home/james/docs | 04/03/2019 3:10PM | 50 KB | 4/4/2019 - Current |

FIG. 2A

| Item Name | Item Type | Asset | Location | Last Modified | Size | Backup Range |
|---|---|---|---|---|---|---|
| ☐ CustomerList.xlsx | Spreadsheet | JamesLaptop | C:\users\james\Documents | 01/02/2019 9:01PM | 22 KB | 1/1/2019 - 1/10/2019 |
| ☐ CustomerList.xlsx | Spreadsheet | JamesLaptop | C:\users\james\Documents | 01/11/2019 3:54AM | 23 KB | 1/11/2019 - 1/12/2019 |
| ☐ CustomerList.xlsx | Spreadsheet | JamesLaptop | C:\users\james\Documents | 01/13/2019 4:03AM | 30 KB | 1/13/2019 - 1/20/2019 |
| ☐ CustomerList.xlsx | Spreadsheet | JamesLaptop | C:\users\james\Documents | 01/21/2019 6:31PM | 36 KB | 1/21/2019 - Current |

```
{
  "query": { "bool": { "must": [
    { "match": { "xvname.raw": "CustomerData.xlsx" } },
    { "match": { "xvlocation.raw": "/home/james/ImportantFiles" } },
    { "match": { "dp_entity_name": "linux-191-2-1" } }
  ] } },
  "sort": [ { "xvdate": { "order": "asc" } } ]
}
```

```
{
  "query": { "bool": { "must": [
    { "match": { "xvname.raw": "CustomerData.xlsx" } }
  ] } },
  "sort": [ { "xvdate": { "order": "asc" } } ]
}
```

EXTENSIBLE VERSION HISTORY AND COMPARISON WITHIN A BACKUP

TECHNICAL FIELD

This disclosure relates to comparison of content, and more particularly, identifying content differences.

BACKGROUND

Conventional systems provide for determining difference between documents. Conventional word processing and document editing applications typically have features that allow a user to view content differences between documents and locations within the documents at which the content difference occur. Such conventional applications require the user to identify the documents the user wishes to be compared and to provide folder paths for each file in order for the conventional applications to access the respective documents for comparison.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method and computer program product) for a Version Finder that provides a quick and efficient identification of a desired version of content from an editing history of the content. The Version Finder receives a search index identifying versions of content from an editing history of the content. The Version Finder sorts the search index according to sort criteria and receives a selection from the sorted search index of a first version of the content and a second version of the content. The Version Finder identifies and displays one or more content differences between the first and second versions of the content.

The Version Finder provides many benefits in contrast with the limitations of conventional system. For example, a file (such as a document, email message and/or thread, spreadsheet) may have been edited (i.e. updated, modified, revised) 20 times during a backup time range of 60 days. This may result in 20 backup versions of the same file created at different times during the editing process. An instance of each backup version may be located in different folders and at different types of assets, such as various laptops and various fileservers. It is understood that each backup version of the file may be slightly different since the file had been editing multiple times during the backup time range of 60 days. A user may want to locate a specific version of the file that existed during the file's editing history. However, locating and accessing each of the 20 backup versions of the file is an inefficient use of time and resources. The Version Finder sorts a search index that provides the 20 backup versions of the file listed according to various user-selected sort criteria and allows a user to select which backup versions of the file should be compared against each other. The Version Finder identifies one or more content differences between the user-selected backup versions of the file and displays the content differences. The user may view the content differences and determine whether either of the compared backup versions is the specific version of the file the user is attempting to locate and/or restore.

According to some embodiments, the Version Finder may be pre-defined to support server-side comparison of versions of content that correspond to a pre-defined supported file type. Various embodiments of the Version Finder provide for extensibility and performs comparison of different versions of content via a client-side application that supports an extensible file type selected by a user. According to various embodiments, the Version Finder may send different versions of the content to a requesting client system where a user may perform manual comparison of the versions of the content. According to various embodiments, the Version Finder provides views of respective backup versions of the content and may export one or more backup versions of the content.

In some embodiments, such a system may be provided within an operating environment. An example of such an operating environment is further described herein with reference to FIG. 1. However, in general, embodiments of the disclosure may include and/or be implemented in an operating environment including a cloud services environment that may be, or include, a data protection operating environment that includes a backup and clustered storage environment. For example, at least some functionality may be provided by, or implemented in connection with, various platforms for data protection platform provided by Dell EMC™ Corporation, and associated systems, methods, and components, although use of this particular platform is provided only by way of illustration and is not required.

In some embodiments, the storage environment may take the form of a cloud storage environment. However, embodiments of the disclosure may also be implemented for an on-premises storage environment, and hybrid storage environments that include public and private elements, as well as any other type of storage environment. In addition, any of these cloud environments, or other operating environments, may take the form of an operating environment that is partly, or completely, virtualized. The storage environment may include one or more host devices that each host one or more applications used by a client of the storage environment. As such, a particular client may employ, or otherwise be associated with, one or more instances of each of one or more applications. In general, the applications employed by the clients are not limited to any particular functionality or type of functionality. Some example applications may include database applications (e.g. a SQL Server), filesystems, as well as other types of data stores. The applications on the clients may generate new and/or modified data that is desired to be protected.

Any of the devices, including the clients, servers and hosts, in the operating environment can take the form of software, physical machines, or virtual machines (VM), or any combination thereof, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the term "backup" (or "data backups," "backed-up data," etc.) is intended to be construed broadly and includes, but is not limited to, partial backups, incremental backups, full backups, clones, snapshots, any other type of copies of data, and any combination of the foregoing. Any of the foregoing may, or may not, be deduplicated. In addition, the storage of data can employ any suitable storage technique, infrastructure, hardware (e.g. Solid State Drive (SSD), Hard Disk Drive (HDD)), or on virtual storage systems provided by a cloud service provider, etc.

Figure 1:
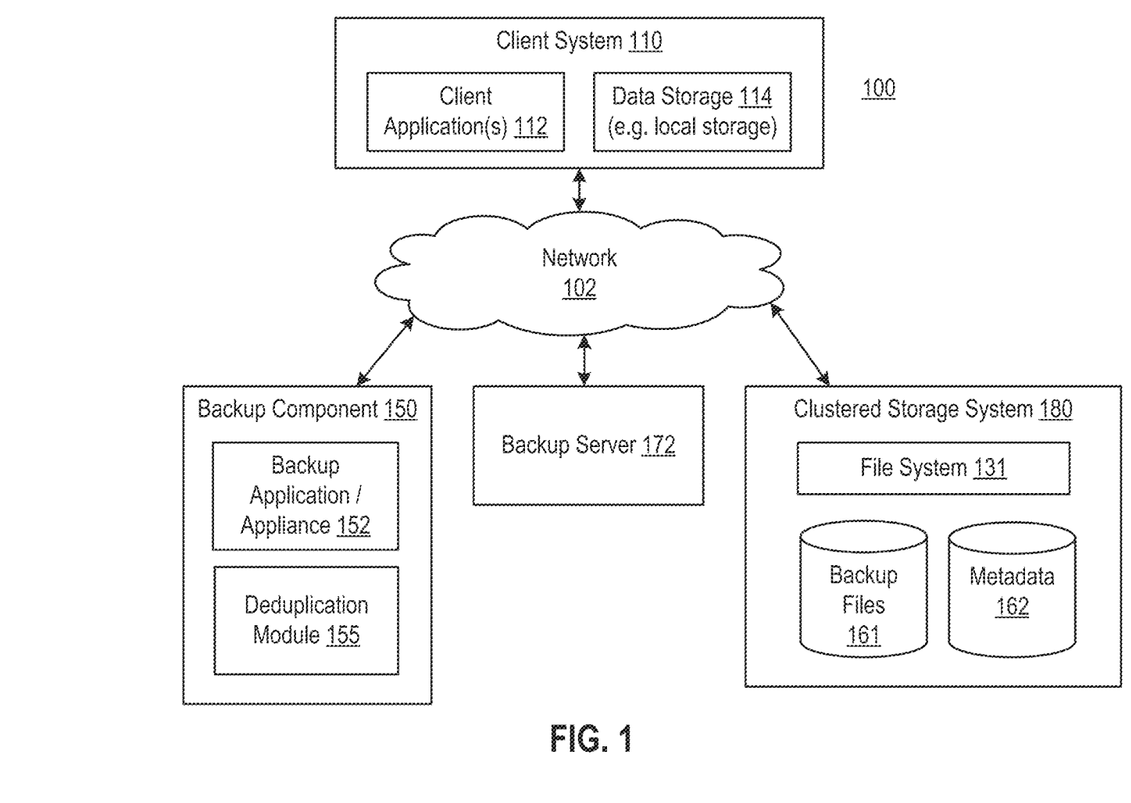
FIG. 1 is a block diagram illustrating an example operating environment for . . . according to one or more embodiments of the disclosure.

More specifically, and with reference to FIG. 1, shown is a block diagram illustrating an example of an operating environment 100 for distributing phases of deduplication processing within a clustered storage environment according to one or more embodiments of the disclosure. As shown, the environment 100 may include a client system 110, backup system 150, backup server 172, and a clustered storage system 180. It should be noted that the components of operating environment 100 may interact via a network 102, which may be any type of wired or wireless network including a local area network (LAN), a wide area network (WAN), or a direct communication link, or other suitable connection.

As shown, the operating environment 100 may include a client or client system (or computer, or device) 110 that may be associated with a client or customer of a data backup and protection service, and a backup system 150 that may be associated with a data backup and protection service provider. For example, the client system 110 may provide computing resources (e.g. webservers, databases, etc.) for users (e.g. website visitors) of the customer, data from which may be protected by the backup and data protection service provider. Accordingly, the client system 110 may act as a client from which backups are performed. In some embodiments, the client system 110 may comprise a virtual machine. In addition, the client system 110 may host one or more client applications 112, and may include data storage 114, as well as an interface for communicating with other systems and devices, such as the backup system 150. In general, the client applications 112 may create new and/or modified data that is desired to be protected. As such, the client system 110 is an example of a host device. The data storage 114 can be used to store client data, which may, along with the client system 110 (e.g. client applications 112) may be backed up using the backup system 150. As further described herein, components of the client system 110 (e.g. client applications, 112, data storage 114, etc.) may be a data source, or be associated with, one or more data sources such as a database, VM, storage device, etc. In addition, components of the client system 110 may be data sources that are associated with the client system 110, but reside on separate servers such as a data server, or a cloud-computing infrastructure. The client system 110 may include a backup client application, or plug-in application, or API that cooperates with backup system 150, to create backups of client data. The backed-up data can also be restored to the client system 110.

In one embodiment, backup component 150 may represent one or more components of a Data Domain Restorer (DDR)-based deduplication storage system, and backup server 172 may be implemented in conjunction with a Data Domain deduplication storage server provided by Dell EMC for use with DDR storage devices. For example, the backup server 172 may be a stand-alone entity, or can be an element of the clustered storage system 180. In some embodiments, the backup server 172 may be a Dell EMC Avamar server or a Dell EMC Networker server, although no particular server is required, and other backup and storage system configurations are contemplated.

The backup component 150, may include a backup application (or appliance) 152 that performs (or manages, coordinates, etc.) the creation and restoration of data that may be backed-up. For example, data to be backed-up from the client system 110 may be communicated from the client system 110 to the backup application 152 for initial processing, after which the processed data is uploaded from the backup application 152 for storage at the clustered storage system (e.g. as backup data 161). In some embodiments, the backup application 152 may cooperate with a backup client application of the client system 110 to back up client data to the clustered storage system 180. A backup application 152 may also cooperate with a backup client application to restore backup data from the clustered storage system 180 to the client system 110. In some embodiments, the backup application 152 may be a part of, or work in conjunction with, a storage appliance. For example, the storage appliance may include a Dell EMC CloudBoost appliance, although any suitable appliance is contemplated. In addition, the backup application 152 may provide a variety of useful functionalities such as source-side data deduplication, data compression, and WAN optimization boost performance and throughput while also possibly reducing the consumption and cost of network bandwidth and cloud storage capacity. One, some, or all, of these functions of the backup application 152 may be performed using deduplication logic via deduplication module 155. For example, the deduplication module 155 can provide data segmentation, as well as in-flight encryption as the data is sent by the storage application 152 to the clustered storage system 180. However, as further described herein, in some embodiments, data deduplication may be performed entirely within the clustered storage environment 180. It should be noted that the backup application (or storage appliance) 152 can be implemented in various forms, such as a virtual, physical, or native public cloud appliance to fit the requirements of a particular configuration, and the backup application 152 can be used with various types of data protection environments, including public and private object storage clouds.

The clustered storage system 180 (as further described herein) may store backup files 161 (or backup objects) within a one or more nodes (as further described herein). As shown, the clustered storage system 180 may also store metadata 162 for (or associated with) the backup files 161, and one or more instances of a filesystem 131 that catalogs backup files and other data residing in the clustered environment. In general, the storage of backup files 161 may be configured to store client system 110 data backups that can be restored in the event of a loss of data. It is understood that various embodiments of the Version Finder, as described herein, may be implemented in the operating environment 100 and may communicate with and access data stored by any of the features, modules and components illustrated in FIG. 1.

Figure 2A:
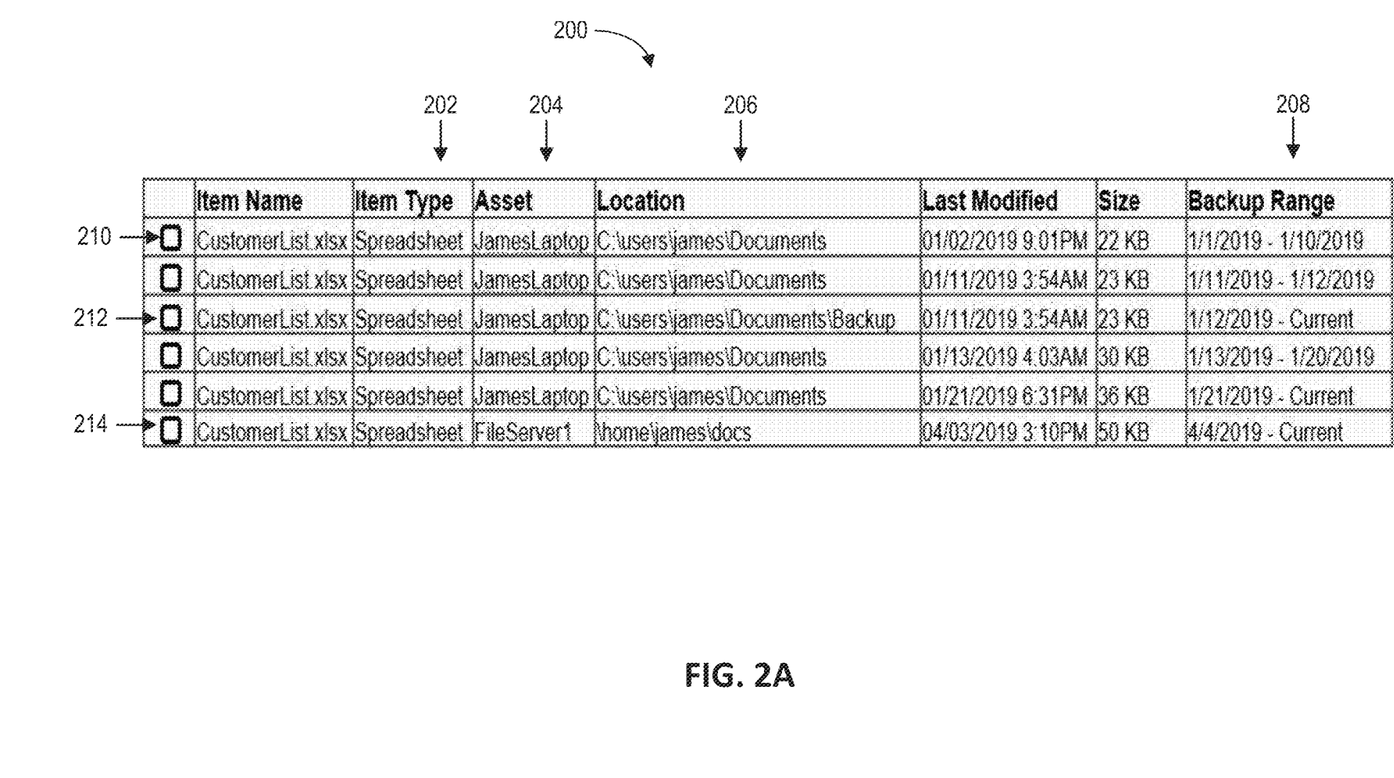
FIGS. 2A and 2B is a block diagram illustrating an example search indices according to one or more embodiments of the disclosure.

As shown in FIG. 2A, a search index 200 received by the Version Finder identifies an instance of a different version of a file ("CustomerList.xlsx") at each row of the search index 200. It is understood that each version of the file listed in each row of the search index 200 represents a different content state of the file during the file's editing history. Each version of the file is of the same file type ("Spreadsheet"), as shown in an item type column 202. Each version of the file may be located on a different asset. For example, various versions of the file 210, 212 may be located on same computer laptop system ("JamesLaptop"), as shown in asset column 204. However, another version of the file 214 may be located at a file server. Various versions 210, 212 that are located at the same asset may still be stored at different storage locations, as listed in a location column 206. For example, a version of the file 210 may be stored in a "Documents" folder on a computer laptop system, while another version of the file 212 may be stored in a "Documents/Backup" folder on the same computer laptop system. Another version of the file 214 may be stored on a particular "docs" folder at the file server. As shown in the backup range column 208, each version of the file may have been backed up during a different backup time ranges as well.

Figure 2B:
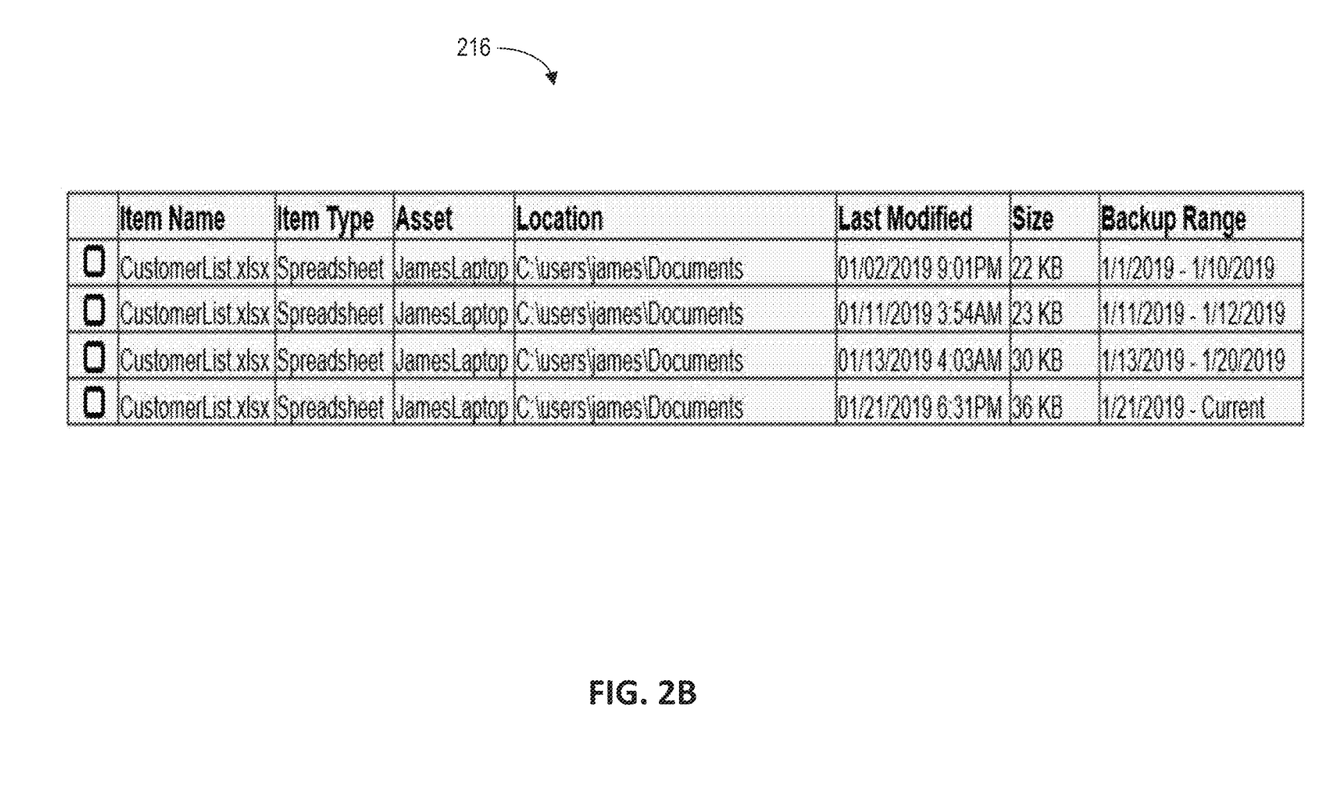

The Version Finder provides functionality for sorting the search index 200 to return a sorted search index 216. The search index 200 may be sorted according to any combination of sorting criteria, such as item name, item type, asset, location, a modification date range, size and/or a backup time range. As shown in FIG. 2B, the search index 200 may be sorted according to a location and an asset type. For example, a user may send a request, that includes user-selected sorting criteria, for the Version Finder to return a sorted search index 216 that identifies only those versions of the file that are located at the same "Documents" folder on the same computer laptop system ("JamesLaptop"). The Version Finder thereby allows for a sorting of the search index 200 that will disregard the file 214 at the file server asset. The Version Finder sorts the search index 200 according to the user-selected sorting criterion and displays the sorted search index 216.

Figure 2C:
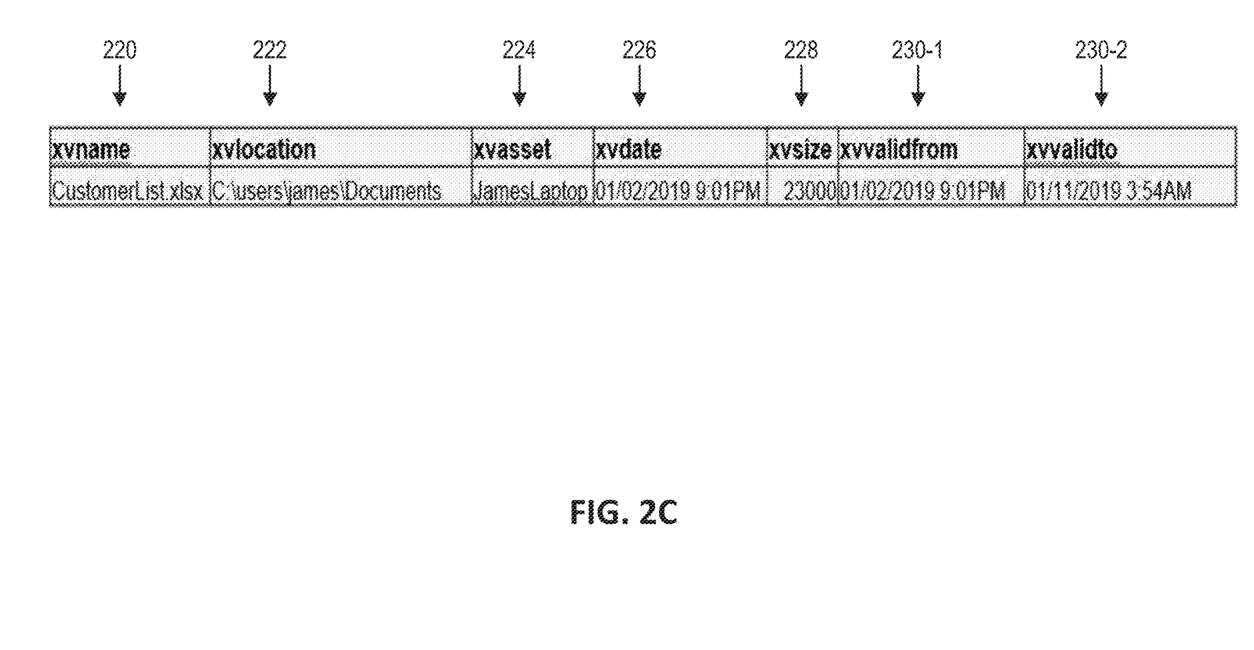
FIG. 2C is a block diagram illustrating example default fields according to one or more embodiments of the disclosure.

According to various embodiments, the search index 200 may be generated according to an Elasticsearch algorithm. The Elasticsearch algorithm may be executed over any portion(s) of the operating environment 100 illustrated in FIG. 1 to generate the search index 200 and provide the search index 200 to the Version Finder. As shown in FIG. 2C, the Elasticsearch algorithm may return search hits according to one or more default fields, such as item name 220, item location 222, asset type 224, modification date 226, item size 228 and a validity range 230-1, 230-2. Any search index may be built based on search hits identified by the Elasticsearch algorithm according to its default fields.

Figure 3A:
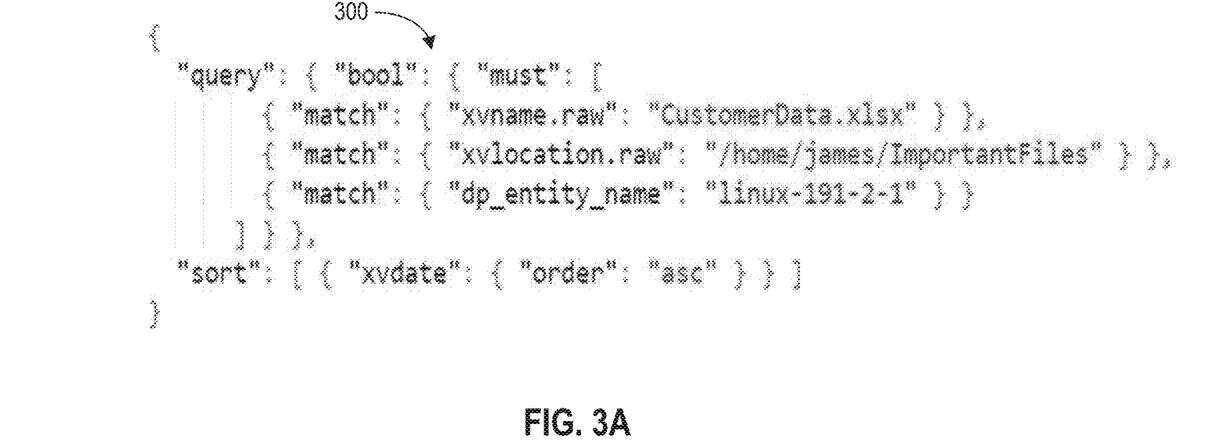
FIGS. 3A and 3B is a block diagram illustrating an example queries according to one or more embodiments of the disclosure.
Figure 3B:
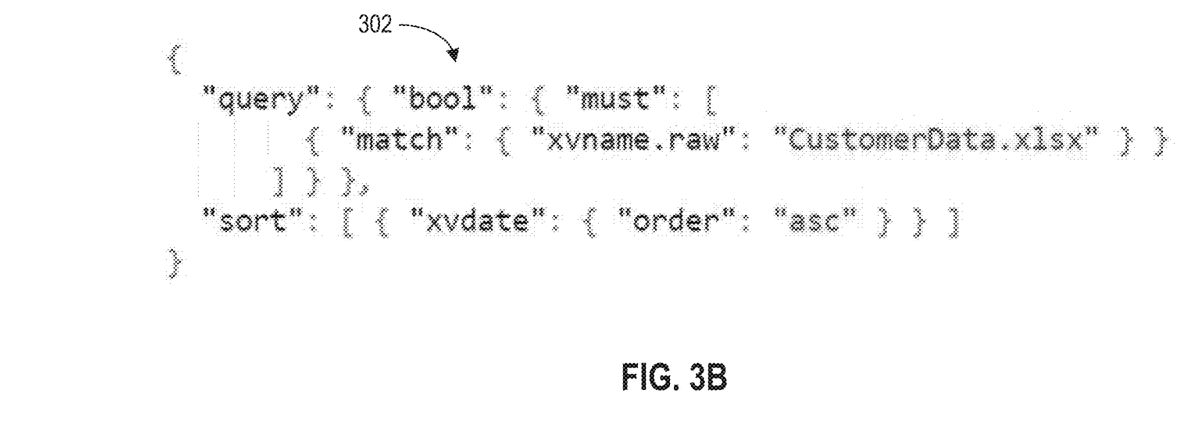

Example query code 300 based on the default fields 220, 22, 224, 226, 228, 230-1, 230-2 of the Elasticsearch algorithm is shown in FIG. 3A. The query code 300 provides for a search for various versions of content from the content's editing history that have the same item name ("CustomerData.xlsx"), are stored the same folder location (" . . . /ImportantFiles") on the same asset ("linux-191-2-1"). As shown in FIG. 3B, example query code 302 provides for a search for various versions of content that have the same item name but may be located in any storage location across any asset type.

Figure 4:
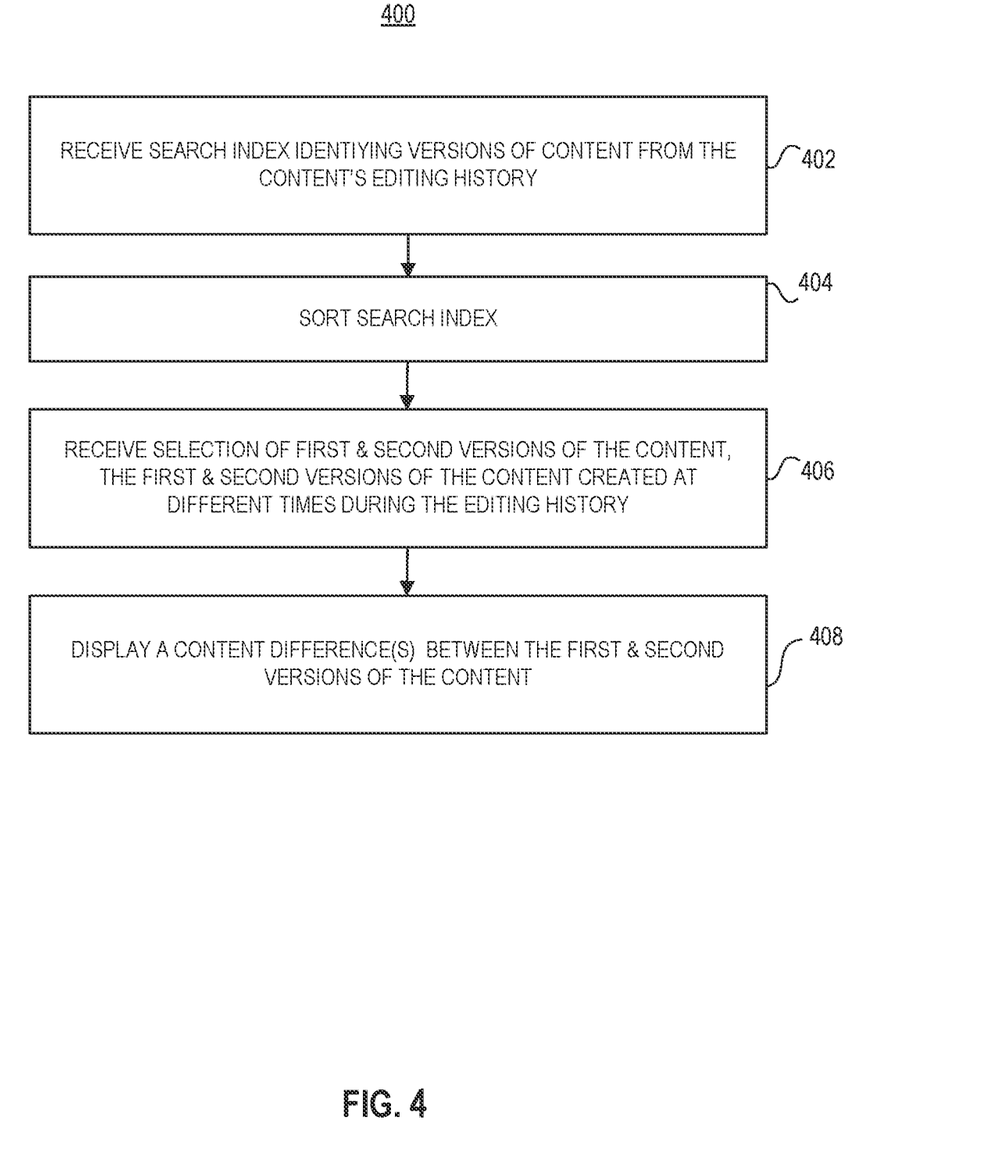
FIG. 4 is a flow diagram illustrating an example method according to one or more embodiments of the disclosure.

FIG. 4 is a flow diagram that illustrates an example method 400 where the Version Finder, at step 402, receives a search index identifying versions of content from an editing history of the content. For example, the Version Finder may receive a search index 200 generated by execution of the Elasticsearch algorithm.

At step 404, the Version Finder sorts the search index according to sort criteria. For example, the Version Finder may receive a request to sort the search index 200 according to sort criteria, such as one or more storage location, one or more device asset locations, one or more modification dates and/or one or more backup time ranges.

At step 406, the Version Finder receives a selection from the sorted search index of a first version of the content and a second version of the content, the first version of the content created at a different time during the editing history than the second version of the content. According to various embodiments, the Version Finder determines whether the first and second versions of the content correspond to a supported file type or an extensible file type. If the first and second versions of the content correspond to the supported file type, the Version Finder performs server-side comparison of the first and second versions in order to identify content differences. If the first and second versions of the content correspond to the extensible file type, the Version Finder sends the first and second versions of the content to the requesting client system for client-side comparison to identify content differences At step 408, the Version Finder identifies one or more content differences between the first and second versions of the content. For example, the Version Finder may generate for display a side-by-side comparison of views of the content differences between the first and second versions of the content. In various embodiments, the content differences may be identified by the Version Finder via one or more server computer system for content that is formatted according to a supported file type. The Version Finder may compare content in the first and second versions of content to identify content in the first version of content that was edited, after the first version of content was created, in order to create content present in the second version of content. In various embodiments, the content differences may be identified by an application at the requesting client system that supports an extensible file type. The Version Finder may call the application according to a call path for triggering comparison features/functionality of the application.

As noted, the operations (or steps) shown in the above process are not necessarily performed in the order indicated and may be performed in parallel, as a single operation, or as multiple operations.

Figure 5:
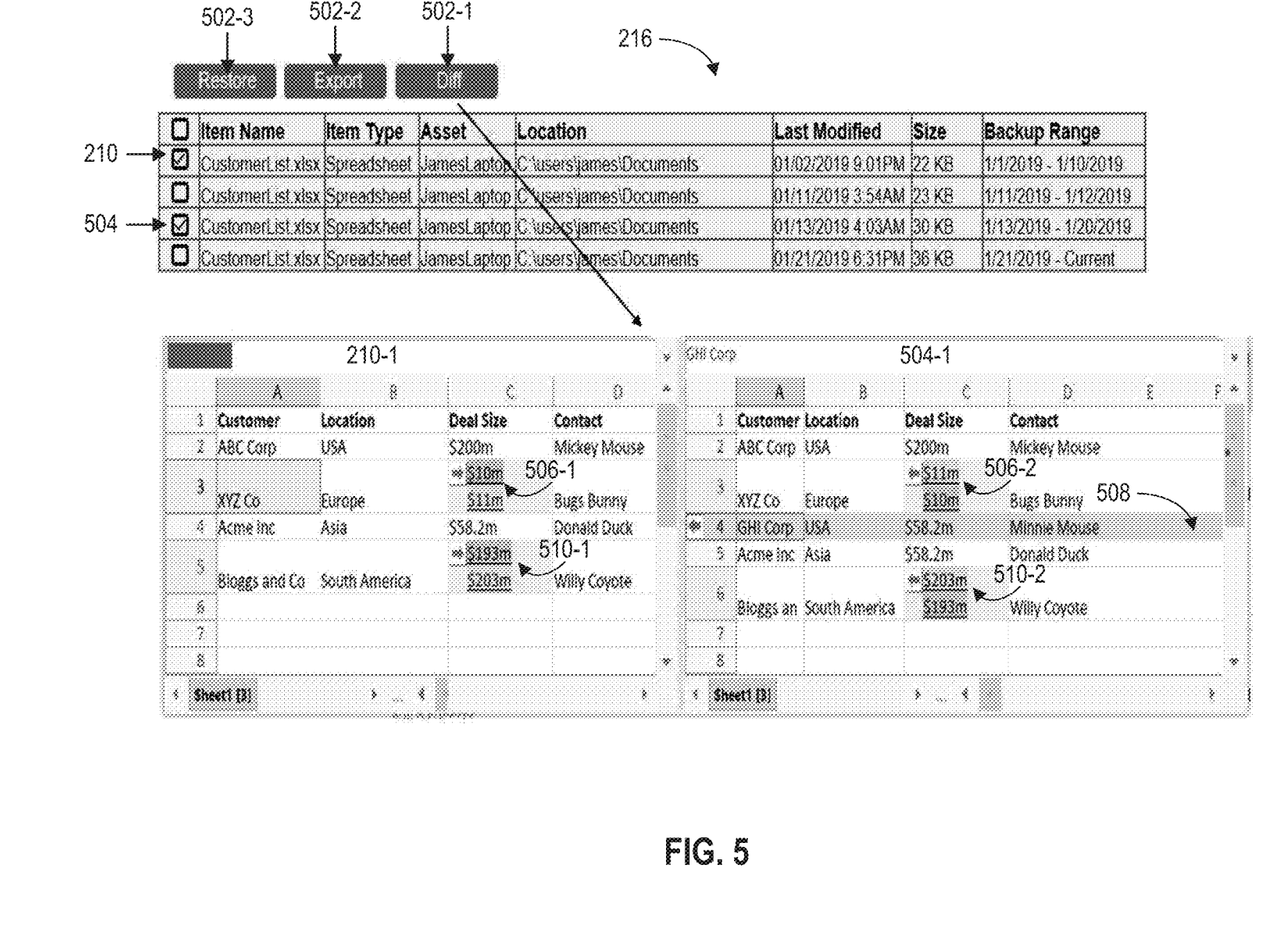
FIG. 5 is a block diagram illustrating an example content differences according to one or more embodiments of the disclosure.

As shown in FIG. 5, the sorted search index 216 may be displayed on a user interface with one or more selectable functionalities 502-1, 502-2, 502-3. A user may select a first version of a file 210 and a second version of the file 504 from the sorted search index 216. It is understood that the first version of the file 210 was modified before the second version of the file 504. However, the second version of the file 504 does not represent a content state immediately after the content state of the first version of the file 210 as there was another version of file that was modified after the first version 210 but before the second version 504.

Upon selecting the first and second versions of the file 210, 504, the user may select a compare functionality 502-1 which sends a request to the Version Finder to compare first and second versions of the file 210, 504. According to some embodiments, the item type ("Spreadsheet" file type) may be a file type supported by the Version Finder. It is understood that that Version Finder may have a plurality of different supported file types (text files, emails, HTML, JSON). When the Version Finder receives a request to compare instances of content formatted according to supported file type, the Version Finder performs the comparison via one or more server computer systems rather than sending the content to the requesting client system 110.

Based on the request, the Version Finder compares the first and second versions of the file 210, 504 that are formatted according to the supported file type. The Version Finder identifies content differences 506-1, 506-2, 508, 510-1, 510-2 via a comparison of the first and second versions of the file 210, 504. For example, the Version Finder detects that a content cell 506-1 in the first version 210 contains "$10 m" while the corresponding content cell 506-2 in the second version 504 was edited to contain "$11 m." The Version Finder may further detect that the second version of the file 504 has a fourth row that contains content ("GHI Corp . . . ") 508 that was never present in the first version 210, which results in the content from the first version's 210 fourth row to be moved down to the second version's 504 fifth row. The Version Finder detects that a content cell 510-1 in the first version 210 contains "$193 m" while the corresponding content cell 510-2 in the second version 504 was edited to contain "$203 m."

The Version Finder may generate a side-by-side comparison of a content difference view 210-1 of the first version of the file 210 and a content difference view 504-1 of the second version of the file 504. The Version Finder modifies the first version's cell 506-1 to illustrate a transition of the content ("→$10 m $11 m") from the first version 210 to the later second version 504. The transition of content represents that the content in the corresponding cells 506-1, 506-2 belong to a content transition that occurred during the file's editing history in that the content in the first version's cell 506-1 was edited in order to create the content in the second version's cell 506-2. For example, the Version Finder may capture a portion of content ("$11 m") from the second version's corresponding cell 506-2 and incorporate the captured content ("$11 m") into the view 210-1 to be displayed in proximity to the content in the first version's cell 506-1. The Version Finder modifies the second version's corresponding cell 506-2 to illustrate a reverse transition of content editing ("←$11 m $10 m") from the second version 504 back to the earlier first version 210. The reverse transition of content represents that the content in the corresponding cells 506-1, 506-2 belong to a reverse content transition that occurred during the file's editing history in that the content in the second version's cell 506-2 was created as a result of editing content in the first version's cell 506-1. For example, the Version Finder may capture a portion of content ("$10 m") from the first version's corresponding cell 506-1 and incorporate the captured content ("$10 m") into the view 504-1 to be displayed in proximity to the content in the second version's cell 506-2.

The Version Finder may highlight both cells 506-1, 506-2 according to a cell difference highlight color and may further highlight the different captured content according to different colors. For example, the content ("$10 m") from the first version 210 may be displayed in both views 210-1, 504-1 according to a first highlight color and the content ("$11 m") from the second version 504 may be displayed in both views 210-1, 504-1 according to a second highlight color. It is understood that the cell difference highlight color, the first highlight color and the second highlight color may be different than each other.

The Version Finder modifies the first version's cell 510-1 to illustrate a transition of content editing ("→$193 m $203 m") from the first version 210 to the later second version 504. For example, the Version Finder may capture a portion of content ("$203 m") from the second version 504 and incorporate the captured content ("$203 m") into the view 210-1 to be displayed in proximity to the content in the first version's cell 510-1. The Version Finder modifies the second version's corresponding cell 510-2 to illustrate a reverse transition of content editing ("←$203 m $193 m") from the second version 504 back to the earlier first version 510. For example, the Version Finder may capture a portion of content ("$193 m") from the first version 210 and incorporate the captured content ("$193 m") into the view 504-1 to be displayed in proximity to the content in the second version's cell 510-2. The Version Finder may apply various highlight colors to the cells 510-1, 510-2 and to the different content ("$193 m," "$203 m") as well.

The Version Finder may modify an appearance of the second version's 504 fourth row to illustrate an insertion of the fourth row's content 508 ("←") into the second version 504 after earlier first version 510 was edited. The fourth row of the first version 210 included content ("Acme Inc. . . . ")

that was not edited in order to create the content 508 ("GHI Corp . . . ") in the second version's 504 fourth row. The Version Finder may apply a highlight color to the entire fourth row in the second version view 504-1—but no highlight color is applied to the fourth row in the first version's view 210-1 to illustrate that the content in each of the version's 210, 504 fourth rows are not involved in a transition of content editing during editing history. It is understood that the views 210-1, 504-1 may be displayed at a client 110 system according to the content differences 506-1, 506-2, 508, 510-1, 510-2 identified by the Version Finder via one or more server computer systems.

The user may also select an export functionality 502-2. In response to selection of the export functionality 502-2, the Version Finder may generate file names for the first and second versions 210, 504 and send them to a user configured storage location, such as a folder location on a laptop computer system associated with the user. The user may also select restore functionality 502-3 with respect to a select version of the file listed in the sorted search index 216. In response to selection of the restore functionality 502-3, the Version Finder may send the content contained in the select version of the file to be included in a file at the client system 110.

Figure 6:
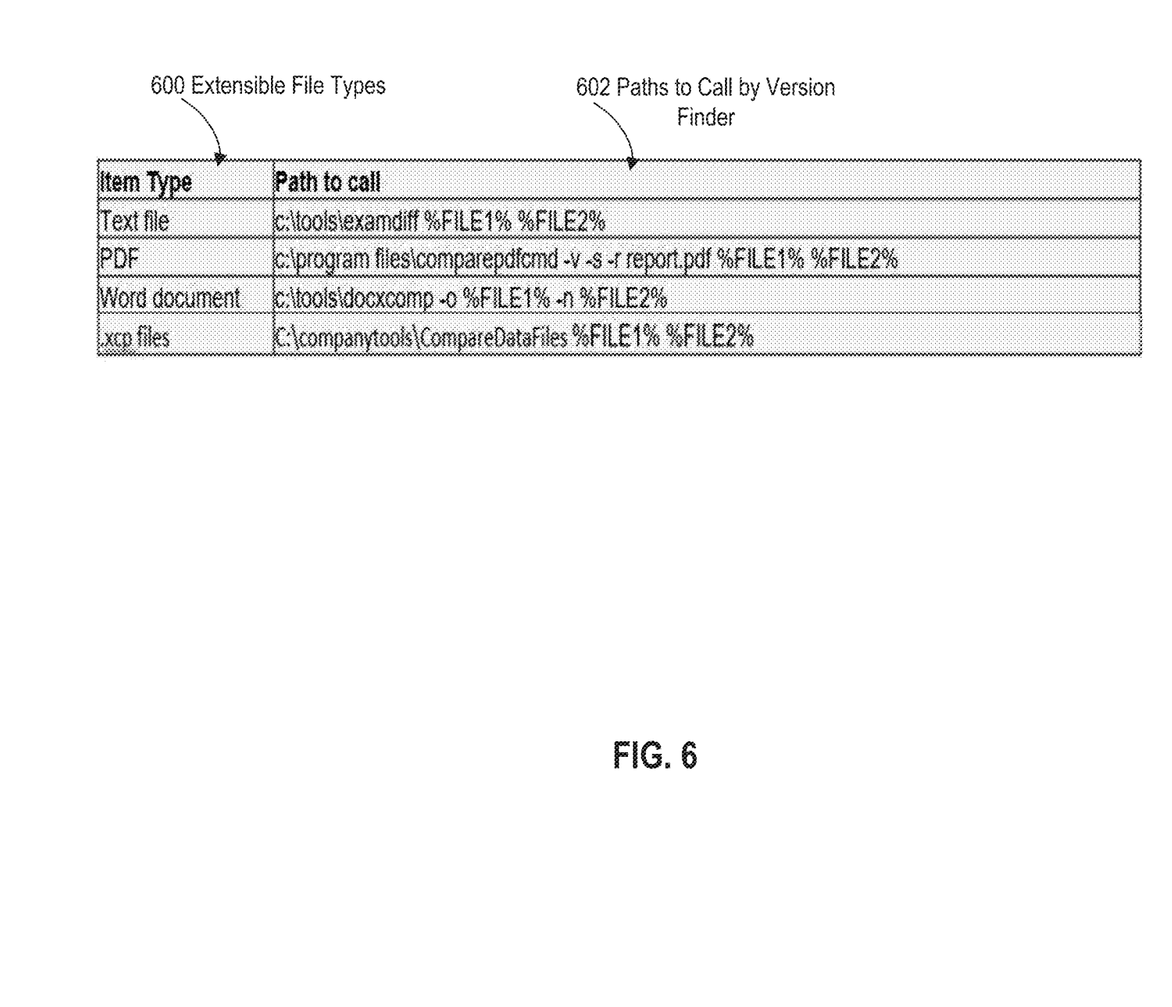
FIG. 6 is a block diagram illustrating an example paths to call according to one or more embodiments of the disclosure.

The Version Finder supports extensibility and may be implemented for comparing documents formatted according to a file type that is unsupported for server-side comparison. As shown in FIG. 6, various paths 602 may be called by the Version Finder for unsupported file types 600. It is understood that the item types listed in FIG. 6 as extensible file types 600 are exemplary and non-limiting. In various embodiments, any of the extensible file types 600 may be supported file types.

Figure 7:
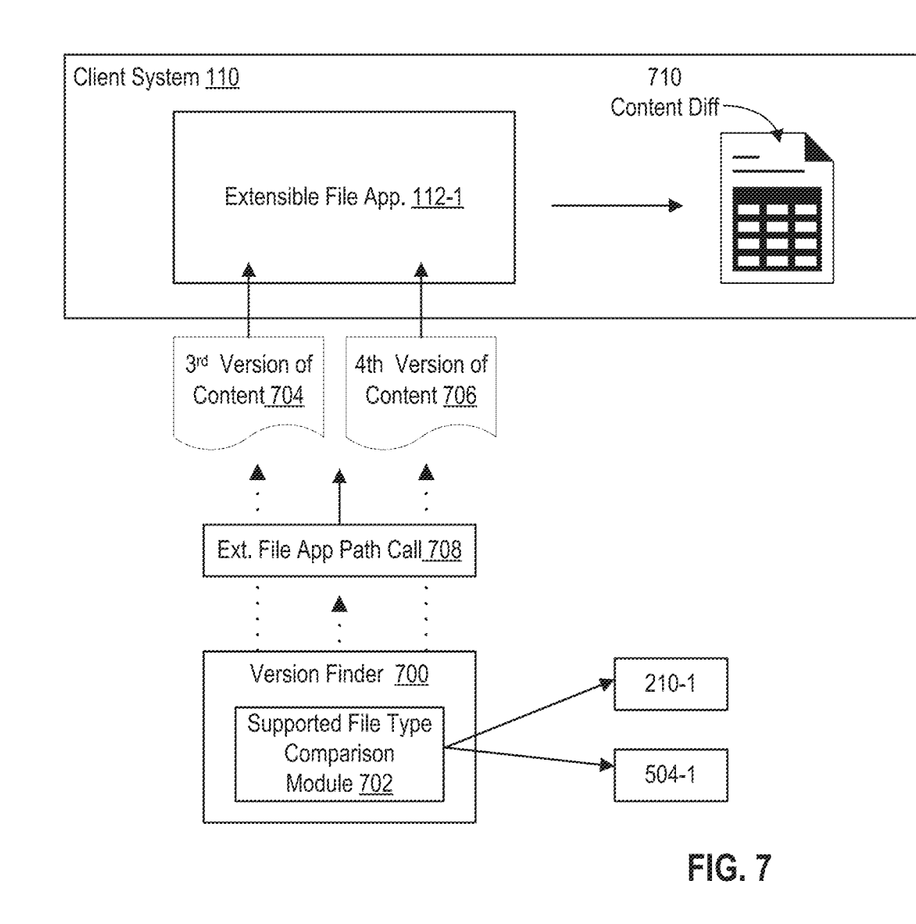
FIG. 7 is a block diagram illustrating an example environment according to one or more embodiments of the disclosure.

As shown in FIG. 7, the Version Finder 700 may include a Supported File Type Comparison Module 702 to perform server-side content comparison between files, as described for generating views 210-1, 504-1 in FIG. 5. When the Version Finder detects that a user has select versions of content 704, 706 for comparison that are formatted according to a particular extensible file type, the Version Finder sends the select versions of content 704, 706 to the requesting client system 110. In addition, the Version Finder sends a call path 708 that corresponds with an application 112-1 at the client system 110 that processes the particular extensible file type. The call path 708 triggers comparison features of the application 112-1 for identifying content differences between the select versions of content 704, 706 and display a content difference view 710 based on the identified content differences. In some embodiments, the Version Finder may send one or more modules, software instructions and/or computer code for execution at the client system 110 in conjunction with the comparison features of the application 112-1. According to various embodiments, the one or more modules, software instructions and/or computer code of the Version Finder for execution in conjunction with the comparison features of the application 112-1 may provide for any of the functionalities as described in FIG. 5 at the client system 110.

Figure 8:
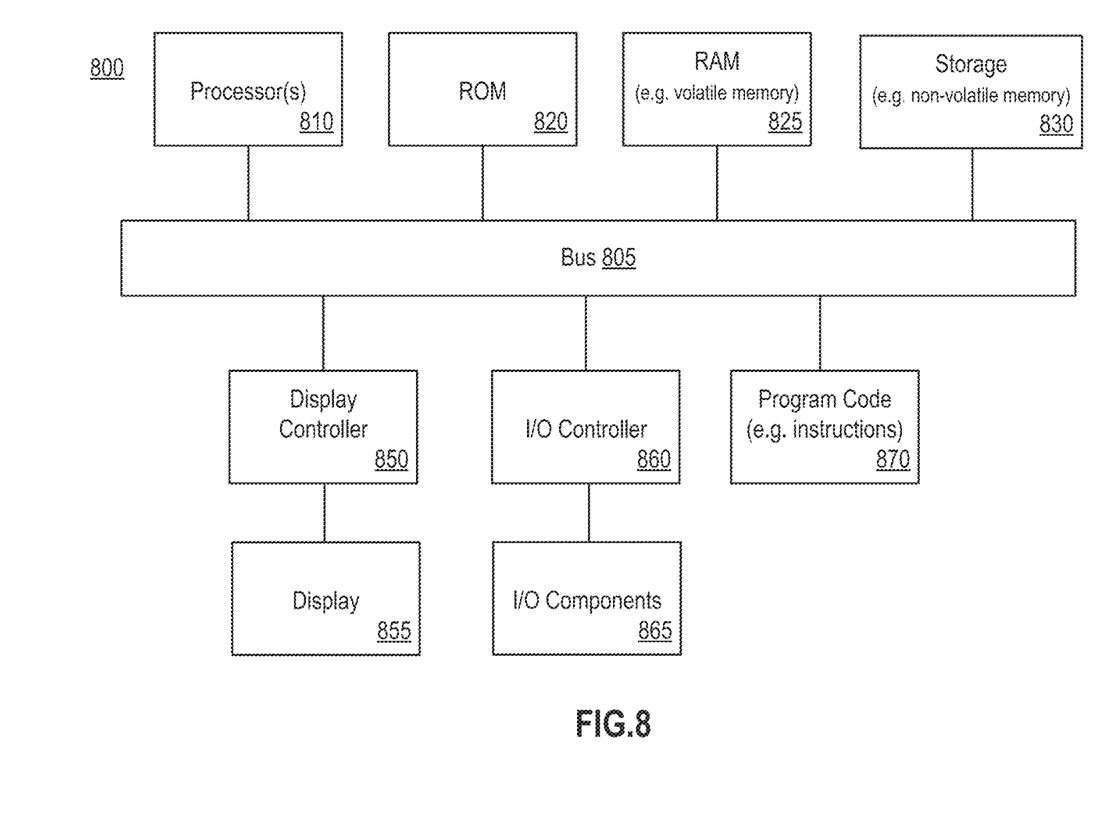
FIG. 8 is a block diagram illustrating an example of a computing system that may be used in conjunction with one or more embodiments of the disclosure.

FIG. 8 shows a block diagram of an example of a computing system that may be used in conjunction with one or more embodiments of the disclosure. For example, computing system 800 (or system, or server, or computing device, or device) may represent any of the devices or systems described herein that perform any of the processes, operations, or methods of the disclosure. Note that while the computing system 800 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 800 may include a bus 805 which may be coupled to a processor 810, ROM (Read Only Memory) 820, RAM (or volatile memory) 825, and storage (or non-volatile memory) 830. The processor(s) 810 may retrieve stored instructions from one or more of the memories 820, 825, and 830 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 810 may perform operations in an on-demand or "cloud computing" environment or as a service (e.g. within a "software as a service" (SaaS) implementation). Accordingly, the performance of operations may be distributed among the one or more processors 810, whether residing only within a single machine or deployed across a number of machines. For example, the one or more processors 810 may be located in a single geographic location (e.g. within a home environment, an office environment, or a server farm), or may be distributed across a number of geographic locations. The RAM 825 may be implemented as, for example, dynamic RAM (DRAM), or other types of memory that require power continually in order to refresh or maintain the data in the memory. Storage 830 may include, for example, magnetic, semiconductor, tape, optical, removable, non-removable, and other types of storage that maintain data even after power is removed from the system. It should be appreciated that storage 830 may be remote from the system (e.g. accessible via a network).

A display controller 850 may be coupled to the bus 805 in order to receive display data to be displayed on a display device 855, which can display any one of the user interface features or embodiments described herein and may be a local or a remote display device. The computing system 800 may also include one or more input/output (I/O) components 865 including mice, keyboards, touch screen, network interfaces, printers, speakers, and other devices. Typically, the input/output components 865 are coupled to the system through an input/output controller 860.

Program code 870 may represent any of the instructions, applications, software, libraries, toolkits, modules, components, engines, units, functions, logic, etc. as described herein. Program code 870 may reside, completely or at least partially, within the memories described herein (e.g. non-transitory computer-readable media), or within a processor during execution thereof by the computing system. Program code 870 may include both machine code, such as produced by a compiler, and files containing higher-level or intermediate code that may be executed by a computing system or other data processing apparatus (or machine) using an interpreter. In addition, program code 870 can be implemented as software, firmware, or functional circuitry within the computing system, or as combinations thereof. Program code 870 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
one or more processors; and
a non-transitory computer readable medium storing a plurality of instructions, which when executed, cause the one or more processors to:
receive a search index identifying versions of content from an editing history of the content;
sort the search index according to sort criteria;
receive a selection from the sorted search index of a first version of the content and a second version of the content, the first version of the content created at a different time during the editing history than the second version of the content;
determine if the first version and second version of the content are of a supported file type or are of an extensible file type; and
identify one or more content differences between the first and second versions of the content using server-based comparison when the first version and second version of the content are of the supported file type and using client-based comparison when the first version and second version are of the extensible file type.

2. The system of claim 1, wherein the plurality of instructions, when executed, further cause the one or more processors to:
compare the first and second versions of the content to identify the one or more content differences at one or more server computers in response to determining the first and second versions of the content correspond to the supported file type; and
send the identified content differences for display at a client system.

3. The system of claim 1, wherein the plurality of instructions, when executed, further cause the one or more processors to:
send the first and second versions of the content to a client system in response to determining the first and second versions of the content correspond to the extensible file type;
call an application that supports the extensible file type at the client system; and
identify the one or more content differences via comparison of the first and second versions of the content by the application that supports the extensible file type.

4. The system of claim 1, wherein the plurality of instructions, when executed, further cause the one or more processors to:
receive a request to download the first and second versions of the content;
generate respective file names for the first and second versions of the content; and
send the first and second versions of the content to a configurable storage location at a client system for user comparison of the first and second versions of the content.

5. The system as in claim 1, wherein the plurality of instructions, when executed, further cause the one or more processors to sort the search index according to at least one of:
i) one or more content storage locations;
ii) one or more device asset locations;
iii) a content item modification date; and
iv) one or more backup time ranges.

6. The system as in claim 1, wherein the plurality of instructions, when executed, further cause the one or more processors to:
receive a request to view a particular version of the content listed in the search index;
provide for display of the particular version of the content; and
export one or more content versions listed in at least one of the search index and the sorted search index to a client system in response to receipt of an export request.

7. A computer-implemented method comprising:
receiving a search index identifying versions of content from an editing history of the content;
sorting the search index according to sort criteria;
receiving a selection from the sorted search index of a first version of the content and a second version of the content, the first version of the content created at a different time during the editing history than the second version of the content;
determining if the first version and second version of the content are of a supported file type or are of an extensible file type; and
identifying one or more content differences between the first and second versions of the content using server-based comparison when the first version and second version of the content are of the supported file type and using client-based comparison when the first version and second version are of the extensible file type.

8. The computer-implemented method of claim 7, further comprising:
comparing the first and second versions of the content to identify the one or more content differences at one or more server computers, in response to determining the first and second versions of the content correspond to the supported file type; and
sending the identified content differences for display at a client system.

9. The computer-implemented method of claim 7, further comprising:
sending the first and second versions of the content to a client system, in response to determining the first and second versions of the content correspond to the extensible file type;
calling an application that supports the extensible file type at the client system; and
identifying the one or more content differences via comparison of the first and second versions of the content by the application that supports the extensible file type.

10. The computer-implemented method of claim 7, further comprising:
receiving a request to download the first and second versions of the content;
generating respective file names for the first and second versions of the content; and
sending the first and second versions of the content to a configurable storage location at a client system for user comparison of the first and second versions of the content.

11. The computer-implemented method of claim 7, further comprising sorting the search index according to at least one of:
i) one or more content storage locations;
ii) one or more device asset locations;
iii) a content item modification date; and
iv) one or more backup time ranges.

12. The computer-implemented method of claim 7, further comprising:
receiving a request to view a particular version of the content listed in the search index;
providing for display of the particular version of the content; and
exporting one or more content versions listed in at least one of the search index and the sorted search index to a client system in response to receipt of an export request.

13. A computer program product comprising a non-transitory computer-readable medium having a computer-readable program code embodied therein to be executed by one or more processors, the program code including instructions to:

receive a search index identifying versions of content from an editing history of the content;
sort the search index according to sort criteria;
receive a selection from the sorted search index of a first version of the content and a second version of the content, the first version of the content created at a different time during the editing history than the second version of the content;
determine if the first version and second version of the content are of a supported file type or are of an extensible file type; and
identify one or more content differences between the first and second versions of the content using server-based comparison when the first version and second version of the content are of the supported file type and using client-based comparison when the first version and second version are of the extensible file type.

14. The computer program product of claim 13, the program code including further instructions to:
compare the first and second versions of the content to identify the one or more content differences at one or more server computers, in response to determining the first and second versions of the content correspond to the supported file type; and
send the identified content differences for display at a client system.

15. The computer program product of claim 13, the program code including further instructions to:
send the first and second versions of the content to a client system, in response to determining the first and second versions of the content correspond to the extensible file type;
call an application that supports the extensible file type at the client system; and
identify the one or more content differences via comparison of the first and second versions of the content by the application that supports the extensible file type.

16. The computer program product of claim 13, the program code including further instructions to:
receive a request to download the first and second versions of the content;
generate respective file names for the first and second versions of the content; and
send the first and second versions of the content to a configurable storage location at a client system for user comparison of the first and second versions of the content.

17. The computer program product as in claim 13, the program code including further instructions to sort the search index according to at least one of:
i) one or more content storage locations;
ii) one or more device asset locations;
iii) a content item modification date; and
iv) one or more backup time ranges.

* * * * *